Patented July 16, 1935

2,008,170

UNITED STATES PATENT OFFICE 2,008,170

PROCESS OF PREPARING A RUBBER ESSENCE

René Botson and Julien Kamp, Auderghem, Belgium

No Drawing. Application April 22, 1931, Serial No. 532,122. In Belgium April 25, 1930

1 Claim. (Cl. 134—17)

For the preparation of this new distillate, rubber waste or Borneo gum and like materials will be used, in view of lowering the cost price. By way of example, the process will be described hereafter by using rubber of old tyres.

If such worn tyres are used, the bead of the tyre will be mechanically severed and put aside. The flattened tyre casing has its rubber portions separated from its fabric base, for instance by means of the "Turner" sawing machine. The part constituted by the fabric base, as also the beads of the tyre cover are digested in an essence or a solvent derived from rubber or from another origin, or a mixture of such solvents, in order to separate the rubber from the fabric waste. The fabric will be separated and bleached by any known means. Besides the fabric parts, this digestion allows to recover the wires giving shape and rigidity to the tyre beads, as the rubber coating said elements will also become dissolved.

All the waste recovered by mechanical means or by digestion is distilled in a heated retort by means of coal-gas or by mazout burners, or by means of carbon or coke or by any other economical heating system, in which, however, contact is avoided between the combustion gases and the material in distillation. The product recovered from this distillation is an unstable liquid having an excessively disagreeable odour.

The gases produced simultaneously with the essence during distillation will be used for heating purposes concurrently with the heating means provided for either the distillation retort mentioned or the rectifying or other apparatus useful in the plant. Such gas containing sulphur, will ony be used after desulphurization by means of soda, potassium, lime or any other hydroxide or metallic salt adapted to fix the sulphur.

The solid residue remaining in the distillation retort, is a black substance useful as a filling material in tyre manufacture or the like. This black substance can be purified so as to become useful for the preparation of paints, for the clarification and decoloration of liquids which have to be treated in this way.

The washing and purification of this black substance is effected as follows:

The black substance is ground into as fine particles as possible and treated within a receiver resisting to the action of acids, by means of hydrochloric acid, the treatment starting in cold and being proceeded with heating towards the end. The gases formed by the contact of this black substance with the acid are recovered. Such gases are composed of $H_2S$ and $CO_2$.

$H_2S$ is fixed for instance in an alkaline solution of sodium, potassium, lime or the like, or in any other appropriate solution of a mineral or organic salt, so as to form a sulphide. $CO_2$ is recovered to form alkaline carbonates or the like. The black substance after this treatment is washed with water, until all traces of acidity will have disappeared. The substance is dried, ground and sifted. The wash-water is concentrated for the purpose of crystallization.

The crystalline mass obtained therefrom contains chlorides of all the mineral substances which constituted the filling material of the tyre rubber, such as for instance lead chloride, magnesium chloride, calcium chloride, zinc chloride and the like.

The raw liquid resulting from the distillation is brought in contact with a caustic soda solution or any other appropriate alkali within a hermetical apparatus, and heating is applied at temperatures between 70° C. and the boiling point of the solution. During this heating process, the mass is vigorously malaxed. This treatment being accomplished, the liquid is left at rest. The decanted liquid is washed with water to eliminate the alkali which may be carried therewith. After this washing and after decantation, the essence obtained is mixed with a small percentage of concentrated sulphuric acid or any other organic or mineral acids, or with an acid salt of an organic or mineral acid of any kind having the equivalent properties in the presence of the new essence obtained as the aforesaid sulphuric acid. After refrigerating and complete setting of the tars which have been precipitated by the acid, the essence is decanted, washed and distilled upon a quantity of sodium carbonate or any other neutralizing substance, particularly quick or slaked lime.

The essence is separated in two portions by fractionary distillation:

No. 1: the essence boiling between 70 and 250° C.;

No. 2: the essence boiling between 250 and 400° C. and more.

The essence No. 1 is yellowish. In this essence is brought in digestion, plant gum or the like, at a degree of 5% or more or less of its volume. This essence has the property to form with the gum a solution of indefinite preservation. It can be mixed: (1°) with a synthetic tannin having a base of phenol, naphthol or like agents and which can be used for tanning hides of any kind; (2°) the same essence can be mixed with a chrome salt or a mineral tanning agent of any kind, so as to considerably improve the tanning obtained with such process.

The aforesaid essence can also be mixed at the moment of use or in the manufacture of extracts, with a pyrogallic tanning or also with a catechitic tanning agent; it will decolorize the latter and produce a colourless tanning agent having a rapidity of action which has not been obtained up to now, and the leather obtained will be of higher solidity and resistance than the leather obtained by the ordinary processes.

This essence has the property of making any appropriate filling material impregnate the inner mass of the leather. The essence is useful for tanning after the fulling or mashing process and it will present the advantage of considerably reducing the duration of the tanning process, whereas the spaces separating the fibres of the hides will become perfectly filled, so that a considerable economy of material is secured.

The essence No. 2 of the distillation process (250 to 400° C. and more) by its property of dissolving greasy substances, will form with the latter or with similar filling materials, a nourishment for the leather, so as to give to the latter, even when imperfectly tanned, an unusual resistance or strength.

By way of example, it is cited that this latter essence will make cellulosic materials penetrate within the fibres of the leather.

The two essences, owing to their property of dissolving aniline dyes, are also useful for dying by soaking or brushing processes.

The tanning compositions cited herebefore and modified in their percentages of resins, tanning agents and essences, are useful for any kind of hides and skins. Said tanning agents will also, following the proportions used, impart impermeability to leather, so that water will no more penetrate into said leather, which, however, remains porous to air.

According to the materials impregnated by means of the new essence, a leather can also be made incombustible.

The leathers and skins treated with the new ingredients are useful for the manufacture of leather clothing, for covering the bodies of aeroplanes, motor-cars and transport apparatus, as also for use upon furniture and the like.

We claim:

The process of preparing a colloidal dispersion of rubber for impregnating fibrous and porous substances which consists in distilling rubber in a closed container until complete destruction, purifying the liquid obtained by means of alkali, washing the liquid, treating the liquid with an acid, washing, neutralizing and fractionarily distilling the purified liquid to obtain an essence boiling between 70 and 250° C. and an essence boiling between 250 and 400° C., the rubber being dispersed in the proportion of five percent by weight in either of the essences according to the utilization purpose of the dispersion.

RENÉ BOTSON.
JULIEN KAMP.